United States Patent
Takeuchi et al.

(10) Patent No.: US 10,081,718 B2
(45) Date of Patent: Sep. 25, 2018

(54) RESIN PARTICLE COMPOSITION

(71) Applicant: FUJI XEROX CO., LTD., Tokyo (JP)

(72) Inventors: Sakae Takeuchi, Kanagawa (JP); Hiroyoshi Okuno, Kanagawa (JP); Satoshi Inoue, Kanagawa (JP); Yoshifumi Iida, Kanagawa (JP); Tomohito Nakajima, Kanagawa (JP); Yuka Zenitani, Kanagawa (JP); Yoshifumi Eri, Kanagawa (JP); Yasuo Kadokura, Kanagawa (JP); Takeshi Iwanaga, Kanagawa (JP); Shunsuke Nozaki, Tokyo (JP); Yasuhisa Morooka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 138 days.

(21) Appl. No.: 15/218,450

(22) Filed: Jul. 25, 2016

(65) Prior Publication Data
US 2017/0226314 A1   Aug. 10, 2017

(30) Foreign Application Priority Data
Feb. 10, 2016   (JP) ................. 2016-024141

(51) Int. Cl.
| *C08K 3/36* | (2006.01) |
| *C08K 3/013* | (2018.01) |
| *C08K 9/08* | (2006.01) |
| *C08K 3/00* | (2018.01) |
| C08K 3/22 | (2006.01) |
| B29B 7/00 | (2006.01) |
| C08K 3/24 | (2006.01) |

(52) U.S. Cl.
CPC .............. *C08K 3/36* (2013.01); *C08K 3/0033* (2013.01); *C08K 3/013* (2018.01); *C08K 9/08* (2013.01); *B29B 7/005* (2013.01); *C08K 3/24* (2013.01); *C08K 2003/2213* (2013.01); *C08K 2003/2227* (2013.01); *C08K 2201/003* (2013.01); *C08K 2201/016* (2013.01)

(58) Field of Classification Search
CPC .................................................. B32B 19/048
See application file for complete search history.

(56) References Cited

U.S. PATENT DOCUMENTS

| 2003/0134950 | A1 | 7/2003 | Kudo et al. | |
| 2008/0069606 | A1* | 3/2008 | Yamashita | G03G 9/0804 399/307 |
| 2014/0050504 | A1* | 2/2014 | Fukao | G03G 9/0827 399/111 |

FOREIGN PATENT DOCUMENTS

| JP | h05295301 | * 11/1993 | ........... C09D 181/00 |
| JP | 2000-044226 A | 2/2000 | |

OTHER PUBLICATIONS

Aug. 29, 2017 Office Action issued in Japanese Application No. 2016-024141.

\* cited by examiner

*Primary Examiner* — Ling Siu Choi
*Assistant Examiner* — Thuy-Ai N Nguyen
(74) *Attorney, Agent, or Firm* — Oliff PLC

(57) ABSTRACT

A resin particle composition includes resin particles, polishing agent particles having an average circle-equivalent diameter of 0.1 μm to 3.0 μm, and silica particles having a compression aggregation degree of 60% to 95% and a particle compression ratio of 0.20 to 0.40.

7 Claims, No Drawings

RESIN PARTICLE COMPOSITION

CROSS-REFERENCE TO RELATED APPLICATIONS

This application is on and claims priority under 35 USC 119 from Japanese Patent Application No. 2016-024141 filed Feb. 10, 2016.

BACKGROUND

1. Technical Field

The present invention relates to a resin particle composition.

2. Related Art

A resin particle composition has been applied as various applications such as a binder.

Here, in the resin particle composition, for example, silica particles may be used together with resin particles in order to improve the strength and fluidity of resin particles and prevent the packing of resin particles. In particular, powder, such as resin particles, is often subjected to a transportation method (hereinafter, also referred to as "air transportation") in which powder is transported by air flowing in a pipe. In the application of this transportation method, the improvement in fluidity of resin particles is important.

SUMMARY

According to an aspect of the invention, there is provided a resin particle composition, including:

resin particles;

polishing agent particles having an average circle-equivalent diameter of 0.1 µm to 3.0 µm; and silica particles having a compression aggregation degree of 60% to 95% and a particle compression ratio of 0.20 to 0.40.

DETAILED DESCRIPTION

Hereinafter, exemplary embodiments of the present invention will be described.

Resin Particle Composition

The resin particle composition according to the present embodiment includes resin particles, polishing agent particles having an average circle-equivalent diameter of 0.1 µm to 3.0 µm, and silica particles having a compression aggregation degree of 60% to 95% and a particle compression ratio of 0.20 to 0.40 (hereinafter, referred to as "specific silica particles").

The resin particle composition according to the present embodiment has the above configuration, thereby preventing the clogging in the pipe and the mixing of coarse powder in the case of transporting the resin particle composition by air. The reason for this is not clear, but it is considered to be due to the following reasons.

It is considered that, when the compression aggregation degree and particle compression ratio of the specific silica particles are within the above ranges, respectively, the following effects are exhibited.

First, the significance of setting the compression aggregation degree of the specific silica particles to 60% to 95% will be described.

The compression aggregation degree is an index indicating the cohesion of silica particles and the adhesion of silica particles to resin particles. This index is indicated by the degree of unraveling difficulty of a compact obtained by compressing silica particles when dropping the compact of silica particles.

Thus, as the compression aggregation degree increases, the cohesive force (intermolecular force) of silica particles tends to become stronger, and the adhesion force of silica particles to resin particles also tends to be stronger. The details of the method of calculating the compression aggregation degree will be described later.

Therefore, in the specific silica particles, the compression aggregation degree of which is highly controlled in a range of 60% to 95%, the upper limit value of the compression aggregation degree thereof is set to 95%, from the viewpoint of securing the fluidity of silica particles and the dispersibility of silica particles to resin particles while maintaining good cohesion of silica particles and good adhesion of silica particles to resin particles.

Next, the significance of setting the particle compression ratio of the silica particles to 0.20 to 0.40 will be described.

The particle compression ratio is an index indicating the fluidity of silica particles. Specifically, the particle compression ratio is indicated by the ratio of difference between compressed apparent specific gravity and loose apparent specific gravity of silica particles to compressed apparent specific gravity of silica particles ((compressed apparent specific gravity−loose apparent specific gravity)/compressed apparent specific gravity).

Thus, as the particle compression ratio decreases, the fluidity of silica particles increases. Further, as the fluidity of silica particles increases, the dispersibility of silica particles to resin particles tends to become high. The details of the method of calculating the particle compression ratio will be described later.

Therefore, the silica particles, the particle compression ratio of which is lowly controlled in a range of 0.20 to 0.40, have good fluidity and good dispersibility to resin particles. However, from the viewpoint of improving the cohesion of silica particles and the adhesion of silica particles to resin particles while maintaining good fluidity of silica particles and good dispersibility of silica particles to resin particles, the lower limit value of the particle compression ratio is set to 0.20.

From the above, the specific silica particles are characterized in that the specific silica particles are easily fluidized, the specific silica particles are easily dispersed in resin particles, and the specific silica particles have high cohesive force and high adhesion force to resin particles. Accordingly, the specific silica particles, the compression aggregation degree and particle compression ratio of which satisfy the above range, are silica particles having properties of high fluidity, high dispersibility to resin particles, high cohesion, and high adhesion to resin particles.

Next, estimated effects at the time of using resin particles and polishing agent particles and further using specific silica particles will be described.

First, since the specific silica particles have high fluidity and high dispersibility to resin particles, the specific silica particles easily adhere to the surface of resin particles in an almost uniform state when the specific silica particles are mixed with resin particles.

Further, when resin particles and polishing agent particles are used and the specific silica particles are further used, the specific silica particles also easily adhere to the surface of the polishing agent particles. Further, in the polishing agent particles, to which the specific silica particles are adhered, the fluidity of the polishing agent particles themselves, and the dispersibility of the polishing agent particles to the resin particles are easily improved. Therefore, when the specific particles are used, the polishing agent particles easily adhere to the surface of the resin particles in an almost uniform state. As a result, the chance of contact between the polishing agent particles in the resin particle composition and the resin particle composition deposited in the pipe increases, and thus an abrasion effect is considered to be improved.

Meanwhile, since the specific silica particles adhered to the surface of the resin particles once have high adhesion to the resin particles, it is difficult to cause the movement on the resin particles and the liberation from the resin particles at a load attributable to the air flow occurring when transporting the resin particle composition by air.

Further, the polishing agent particles adhered to the resin particles together with the specific silica particles are also easily immobilized on the resin particles by the specific silica particles adhered to the surface of the polishing agent particles. Therefore, in the resin particle composition, it is difficult to change a structure in which the specific silica particles and the polishing agent particles adhere to the resin particles.

As a result, the chance of contact between the polishing agent particles in the resin particle composition of the present exemplary embodiment and the resin particle composition deposited in the pipe increases, thereby improving a polishing effect. Further, in the case where the resin particle composition is transported by air, it is considered that the fixation of the resin particle composition into the pipe is prevented, thereby preventing the mixing of coarse powder.

From the above, in the resin particle composition according to the present exemplary embodiment, it is estimated that the specific silica particles are used together with the resin particles and the polishing agent particles, thereby preventing the clogging in the pipe and the mixing of coarse powder in the case of transporting the resin particle composition by air.

There is a case where the resin particle composition of the present exemplary embodiment is deposited in the pipe in a state in which the specific silica particles adhered to the resin particles adhere to each other. In this case, the resin particle composition deposited in the pipe is easily relaxed by air flowing in the pipe at an interface at which the specific silica particles adhere to each other, because the specific silica particles have the above-described unique properties. Therefore, the resin particle composition of the present exemplary embodiment, due to the above configuration, also has an effect of easily preventing the deposition of the resin particle composition in the pipe, thereby easily preventing the clogging in the pipe.

In the resin particle composition according to the present exemplary embodiment, it is preferable that the particle dispersion degree of the specific silica particles is 90% to 100%.

Here, the significance of setting the particle dispersion degree of the specific silica particles to 90% to 100% will be described.

The particle dispersion degree is an index indicating the dispersibility of silica particles. This index is indicated by the degree of easiness of dispersion of silica particles to resin particles in the primary particle state. Specifically, the particle dispersion degree is indicated by the ratio of actually-measured coverage C to calculated coverage $C_0$ (actually-measured coverage C/calculated coverage $C_0$) when the calculated coverage of resin particles with silica particles is represented by $C_0$ and the actually-measured coverage thereof is represented by C.

Therefore, as the particle dispersion degree increases, silica particles are difficult to aggregate, and are easy to be dispersed to the resin particles in the primary particle state. The details of the method of calculating the particle dispersion degree will be described later.

The dispersibility of the specific silica particles to the resin particles is further improved by controlling the particle dispersion degree to 90% to 100% at a high level while controlling the compression aggregation degree and the particle compression ratio within the above range. Thus, the polishing agent particles in the resin particle composition have higher dispersibility to the surface of the resin particles. As a result, the resin particle composition exhibits a high polishing effect, thereby easily preventing the clogging in the pipe and the mixing of coarse powder in the case of transporting the resin particle composition by air.

In the resin particle composition according to the present exemplary embodiment, as described above, as the specific silica particles, which have properties of high fluidity and high dispersibility to resin particles, high cohesion, and high adhesion to resin particles, silica particles having a siloxane compound having a relatively large weight average molecular weight attached on the surface thereof are preferably exemplified. Specifically, silica particles having a siloxane compound having a viscosity of 1,000 cSt to 50,000 cSt attached on the surface thereof (preferably, the surface attachment amount of the siloxane compound is 0.01% by weight to 5% by weight) are preferably exemplified. These specific silica particles are obtained by a surface treatment method in which the surfaces of silica particles are treated with a siloxane compound having a viscosity of 1,000 cSt to 50,000 cSt such that the surface attachment amount is 0.01% by weight to 5% by weight.

Here, the surface attachment amount is referred to as the rate of surface-treated silica particles to silica particles before the surface treatment (untreated silica particles). Hereinafter, the silica particles before the surface treatment (that is, untreated silica particles) are simply referred to as "silica particles".

The specific silica particles, the surfaces of which are treated with a siloxane compound having a viscosity of 1,000 cSt to 50,000 cSt such that the surface attachment amount is 0.01% by weight to 5% by weight, have high cohesion and high adhesion to resin particles as well as high fluidity and high dispersibility to resin particles, and the compression aggregation degree and particle compression ratio thereof easily satisfy the above requirements. The reason for this is not clear, but it is considered to be due to the following reasons.

When the siloxane compound having relatively high viscosity within the above range adheres to the surface of silica particles in a small amount within the above range, the function derived from the properties of the siloxane compound on the surface of the silica particles is expressed. Although the mechanism is not clear, when the specific silica particles are fluidized, the releasing properties derived from the siloxane compound are easily expressed by adhering a small amount of the siloxane compound having relatively high viscosity to the surface thereof within the above range, or the adhesion between the silica particles is deteriorated by the reduction of the inter-particle force due to the steric hindrance of the siloxane compound. Thus, the fluidity of silica particles and the dispersibility of silica particles to resin particles increase.

Meanwhile, when the silica particles are compressed, the long molecular chains of the siloxane compound of the surface of the silica particles are entangled, so that the closest packing properties of the silica particles increase, and the cohesive force between the silica particles is intensified. Further, it is considered that the cohesive force of the silica particles due to the entanglement of the long molecular chains of this siloxane compound is released by fluidizing the silica particles. In addition to this, the adhesion force of the silica particles to resin particles is also increased by the long molecular chains of the siloxane compound of the surface of the silica particles.

From the above, in the specific silica particles, in which the siloxane compound having viscosity within the above range adheres to the surface of silica particles in a small amount within the above range, the compression aggregation degree and particle compression ratio thereof easily satisfy the above requirements, and the particle dispersion degree thereof also easily satisfy the above requirements.

Hereinafter, the configuration of the resin particle composition will be described.

First, the specific silica particles will be described.

Specific Silica Particles

The specific silica particles have a compression aggregation degree of 60% to 95% and a particle compression ratio of 0.20 to 0.40.

First, the characteristics of silica particles will be described in detail.

Compression Aggregation Degree

The compression aggregation degree of the specific silica particles, from the viewpoint of securing the fluidity of the specific silica particles and the dispersibility of the specific silica particles to resin particles while maintaining good cohesion of the specific silica particles and good adhesion of the specific silica particles to resin particles (particularly, from the viewpoint of preventing the clogging in the pipe and the mixing of coarse powder when transporting the resin particle composition by air), is 60% to 95%, preferably 65% to 95%, and more preferably 70% to 95%.

The compression aggregation degree is calculated by the following method.

A disc-shaped mold having a diameter of 6 cm is filled with 6.0 g of the specific silica particles. Next, the mold is compressed for 60 seconds by a pressure of 5.0 t/cm$^2$ using a compression molding machine (manufactured by Maekawa Testing Machine MFG Co., Ltd.), so as to obtain a compressed disc-shaped compact of the specific silica particles (hereinafter, referred to as "compact before falling"). Thereafter, the weight of the compact before falling is measured.

Next, the compact before falling is placed on a sieve screen having a mesh opening of 600 μm, and is fallen by a vibration sieve machine (part number: VIBRATING MVB-1, manufactured by TSUTSUI SCIENTIFIC INSTRUMENTS CO., LTD.) under the conditions of amplitude of 1 mm and vibration time for 1 minute. Thus, the specific silica particles are fallen from the compact before falling through the sieve screen, and the compact of the specific silica particles remains on the sieve screen. Thereafter, the weight of the remaining compact of the specific silica particles (hereinafter, referred to as "compact after falling") is measured.

Then, the compression aggregation degree is calculated from the ratio of weight of compact after falling to weight of compact before falling, using Equation (1) below.

compression aggregation degree=(weight of compact after falling/weight of compact before falling)× 100     Equation (1):

Particle Compression Ratio

The particle compression ratio of the specific silica particles, from the viewpoint of securing the cohesion of the specific silica particles and the dispersibility of the specific silica particles to resin particles while maintaining good fluidity of the specific silica particles and good adhesion of the specific silica particles into resin particles (particularly, from the viewpoint of preventing the clogging in the pipe and the mixing of coarse powder when transporting the resin particle composition by air), is 0.20 to 0.40, preferably 0.24 to 0.38, and more preferably 0.28 to 0.36.

The particle compression ratio is calculated by the following method.

The compressed apparent specific gravity and loose apparent specific gravity of silica particles are measured using a powder tester (manufactured by Hosokawa Micron Corporation, part number PT-S type). Then, the particle compression ratio is calculated from the ratio of difference between compressed apparent specific gravity and loose apparent specific gravity of silica particles to compressed apparent specific gravity, using Equation (2) below.

particle compression ratio=(compressed apparent specific gravity−loose apparent specific gravity)/ compressed apparent specific gravity     Equation (2):

Here, the "loose apparent specific gravity" is a measurement value derived by filling a container having a volume of 100 cm$^3$ with silica particles and weighing the container filled with the silica particles, and refers to filling specific gravity in a state of the specific silica particles being naturally fallen into the container. The "compressed apparent specific gravity" refers to apparent specific gravity of the specific silica particles which are degased, rearranged and more densely packed by repeatedly applying an impact to the bottom of the container (tapping the bottom of the container) at a stroke length of 18 mm and a tapping speed of 50 times/min 180 times from the state of loose apparent specific gravity.

Particle Dispersion Degree

The particle dispersion degree of the specific silica particles, from the viewpoint of further improving the dispersibility of the specific silica particles to resin particles (particularly, from the viewpoint of preventing the clogging in the pipe and the mixing of coarse powder when transporting the resin particle composition by air), is preferably 90% to 100%, more preferably 95% to 100%, and further more preferably 100%.

The particle dispersion degree refers to the ratio of actually-measured coverage $C$ of resin particles with the specific silica particles to calculated coverage $C_0$, and is calculated using Equation (3) below.

particle dispersion degree actually-measured coverage $C$/calculated coverage $C_0$     Equation (3):

Here, the calculated coverage $C_0$ of the surface of resin particles with the specific silica particles may be calculated using Equation (3-1) below, when the volume average particle diameter of resin particles is represented by $dt$ (m), the average circle-equivalent diameter of the specific silica particles is represented by $da$ (m), the specific gravity of resin particles is represented by $\rho t$, the specific gravity of the specific silica particles is represented by $\rho a$, the weight of resin particles is represented by $Wt$ (kg), and the addition amount of the specific silica particles is represented by $Wa$ (kg).

calculated coverage $C_0=\sqrt{3}/(2\pi)\times(\rho t/\rho a)\times(dt/da)\times (Wa/Wt)\times100(\%)$     Equation (3-1):

The actually-measured coverage $C$ of the surface of resin particles with the specific silica particles may be calculated using Equation (3-2) below, after the signal intensities of silicon atoms derived from the specific silica particles are measured with respect to only the resin particles, only the specific particles, and the resin particles including the specific silica particles, respectively, by an X-ray photoelectron spectroscopy (XPS) ("JPS-9000MX", manufactured by JEOL Ltd.).

$$\text{actually-measured coverage } C=(z-x)/(y-x)\times 100(\%) \quad \text{Equation (3-2):}$$

In Equation (3-2), x represents signal intensity of silicon atoms derived from the specific silica particles with respect to only the resin particles. y represents signal intensity of silicon atoms derived from the specific silica particles with respect to only the specific silica particles. z represents signal intensity of silicon atoms derived from the specific silica particles with respect to the resin particles coated (covered) with the specific silica particles.

Average Circle-Equivalent Diameter

The average circle-equivalent diameter of the specific silica particles, from the viewpoint of improving fluidity, dispersibility to resin particles, cohesion, and adhesion to resin particles (particularly, from the viewpoint of preventing the clogging in the pipe and the mixing of coarse powder when transporting the resin particle composition by air), is preferably 40 nm to 200 nm, more preferably 50 nm to 180 nm, and further more preferably 60 nm to 160 nm.

The average circle-equivalent diameter D50 of the specific silica particles are obtained as follows. Primary particles after dispersing the specific silica particles into resin particles are observed by a scanning electron microscope (SEM) (S-4100, manufactured by Hitachi, Ltd.) to capture an image, this image is put into an image analyzer (LUZEX III, manufactured by Nireco Corporation), the area of each particle is measured by the image analysis of the primary particles, and the circle-equivalent diameter of the particle is calculated from this area value. The 50% diameter (D50) in the volume-based cumulative frequency of the obtained circle-equivalent diameter is set to the average circle-equivalent diameter D50 of the specific silica particles. In addition, the magnification of the electron microscope is adjusted such that 10 to 50 specific silica particles appear in one field of view, and the circle-equivalent diameter of the primary particle is obtained in combination with observations in multiple fields of view.

Average Circularity Degree

Although the shape of the specific silica particles may be any of a spherical shape and different shapes, the average circularity degree of the specific silica particles, from the viewpoint of improving fluidity, dispersibility to resin particles, cohesion, and adhesion to resin particles in the specific silica particles (particularly, from the viewpoint of preventing the clogging in the pipe and the mixing of coarse powder when transporting the resin particle composition by air), is preferably 0.85 to 0.98, more preferably 0.90 to 0.98, and further more preferably 0.93 to 0.98.

The average circularity degree of the specific silica particles is measured by the following method.

First, the circularity degree of the specific silica particles is obtained as "100/SF2" calculated by the following equation, from the analysis of the planar image obtained by observing the primary particles after adhering silica particles to the surface of resin particles by SEM.

$$\text{circularity degree}(100/SF2)=4\pi\times(A/I^2) \quad \text{Equation:}$$

(In the equation, I represents a boundary length of primary particles in an image, and A represents a projected area of primary particles.)

Further, the average circularity degree of the specific silica particles is obtained as 50% circularity degree in the cumulative frequency of circularity degree of 100 primary particles obtained by the above planar image analysis.

Here, a method of measuring the characteristics (compression aggregation degree, particle compression ratio, particle dispersion degree, and average circularity degree) of the specific silica particles in the resin particle composition will be described.

First, specific silica particles and polishing agent particles are separated from the resin particle composition as follows. The resin particle composition is dispersed in methanol, stirred, and then ultrasonically treated with an ultrasonic bath, so as to separate the specific silica particles and polishing agent particles from the resin particle composition. The easiness of the separation of the specific silica particles and polishing agent particles is determined by the particle diameter and specific gravity of the specific silica particles and polishing agent particles, and polishing agent particles having a large diameter and high specific gravity are easily separated. Therefore, the polishing agent particles are separated by setting the ultrasonic treatment condition to a weak condition or precipitating the resin particle composition by the centrifugation which is weak to such a degree that the resin particle composition is not precipitated.

Next, the ultrasonic treatment conditions are changed to a strong condition, and the specific silica particles are separated from the surface of resin particles. In this case, the resin particle composition is precipitated by centrifugation to collect only the methanol dispersed with the specific silica particles, and then this methanol is volatilized, so as to extract the specific silica particles. The ultrasonic treatment condition is adjusted by the specific silica particles and the polishing agent particles.

Then, the above characteristics are measured using the separated specific silica particles.

Next, the configuration of the specific silica particles will be described.

Silica Particles

The specific silica particles, which are particles containing silica (that is, $SiO_2$) as a main component, may be crystalline particles or amorphous particles. The specific silica particles may be particles prepared using a silicon compound, such as water glass or alkoxysilane, as a raw material, and may also be particles obtained by pulverizing quartz.

Examples of the specific silica particles include silica particles fabricated by a sol-gel process (hereinafter, referred to as "sol-gel silica particles"), aqueous colloidal silica particles, alcoholic silica particles, fumed silica particles obtained by a gas-phase process, and molten silica particles. Among these silica particles, sol-gel silica particles are preferable.

Surface Treatment

It is preferable that the specific silica particles are surface-treated with a siloxane compound in order to allow the compression aggregation degree, particle compression ratio and particle dispersion degree thereof to be within the above specific range.

As the surface treatment method, it is preferable to perform the surface treatment to the surface of silica particles in supercritical carbon dioxide using the supercritical carbon dioxide. The surface treatment method will be described later.

Siloxane Compound

The siloxane compound is not particularly limited as long as it has a siloxane skeleton in a molecular structure.

Examples of the siloxane compound include silicone oil and silicone resin. Among these, silicone oil is preferable, from the viewpoint of surface-treating the surface of silica particles in an almost uniform state.

Examples of silicone oil include dimethyl silicone oil, methyl hydrogen silicone oil, methylphenyl silicone oil, amino-modified silicone oil, epoxy-modified silicone oil, carboxyl-modified silicone oil, carbinol-modified silicone oil, methacryl-modified silicone oil, mercapto-modified silicone oil, phenol-modified silicone oil, polyether-modified silicone oil, methylstyryl-modified silicone oil, alkyl-modified silicone oil, higher fatty acid ester-modified silicone oil, higher fatty acid amide-modified silicone oil, and fluorine-modified silicone oil. Among these, dimethyl silicone oil, methyl hydrogen silicone oil, and amino-modified silicone oil are preferable.

The above siloxane compound may be used alone or in combination of two or more.

Viscosity

The viscosity (kinetic viscosity) of the siloxane compound, from the viewpoint of improving fluidity, dispersibility to resin particles, cohesion and adhesion to resin particles in the specific silica particles (particularly, from the viewpoint of preventing the clogging in the pipe and the mixing of coarse powder when transporting the resin particle composition by air), is preferably 1,000 cSt to 50,000 cSt, more preferably 2,000 cSt to 30,000 cSt, and further more preferably 3,000 cSt to 10,000 cSt.

The viscosity of the siloxane compound is obtained by the following procedure. Toluene is added to the specific silica particles, and then the specific silica particles are dispersed in the toluene for 30 minutes by an ultrasonic dispersing machine. Thereafter, supernatant is collected. At this time, a toluene solution containing a siloxane compound in a concentration of 1 g/100 ml is obtained. The specific viscosity [ηsp] (25° C.) at this time is obtained by Equation (A) below.

$$\eta sp=(\pi/\pi 0)-1 \quad \text{Equation (A):}$$

(η0: viscosity of toluene, η: viscosity of solution)

Next, the specific viscosity [ηsp] is substituted into the Huggins Equation represented by Equation (B) below, so as to obtain intrinsic viscosity [η].

$$\eta sp=[\eta]+K'[\eta]^2 \quad \text{Equation (B):}$$

(K': Huggins's constant, K'=0.3 ([η]=1 to 3))

Next, the intrinsic viscosity [η] is substituted into the A. Kolorlov Equation represented by Equation (C) below, so as to obtain molecular weight M.

$$[\eta]=0.215\times 10^{-4} M^{0.65} \quad \text{Equation (C):}$$

Next, the molecular weight M is substituted into the A. J. Barry Equation represented by Equation (D) below, so as to obtain siloxane viscosity [η].

$$\log \eta =1.00+0.0123 M^{0.5} \quad \text{Equation (D):}$$

Surface Attachment Amount

The amount of the siloxane compound adhered to the surface of the specific silica particles, from the viewpoint of improving fluidity, dispersibility to resin particles, cohesion, and adhesion to resin particles in the specific silica particles (particularly, from the viewpoint of preventing the clogging in the pipe and the mixing of coarse powder when transporting the resin particle composition by air), is preferably 0.01% by weight to 5% by weight, more preferably 0.05% by weight to 3% by weight, and further more preferably 0.10% by weight to 2% by weight with respect to silica particles (silica particles before surface treatment).

The surface attachment amount is measured by the following method.

100 mg of the specific silica particles are dispersed in 1 mL of chloroform, and 1 μL of DMF (N,N-dimethylformamide), as an internal standard solution, is added thereto, followed by ultrasonic treatment for 30 minutes with an ultrasonic cleaning machine, so as to extract a siloxane compound into the chloroform solvent. Thereafter, hydrogen nucleus spectrum measurement is performed by a JNM-AL400 type nuclear magnetic resonance apparatus (manufactured by JEOL Ltd.), and the amount of the siloxane compound is obtained from the ratio of a siloxane compound-derived peak area to a DMF-derived peak area. Then, the surface attachment amount is calculated from the obtained amount of the siloxane compound and the amount of silica particles, from which the siloxane compound is liberated, (silica particles, to the surface of which the siloxane compound is not adhered).

The viscosity of the siloxane compound of the specific silica particles and surface attachment amount are measured by separating the specific silica particles and the polishing agent particles from the resin particle composition using the above-described method.

Here, the specific silica particles are surface-treated with a siloxane compound having a viscosity of 1,000 cSt to 50,000 cSt, and the surface attachment amount of the siloxane compound to the surface of silica particles is preferably 0.01% by weight to 5% by weight.

When the above requirements are satisfied, the specific silica particles having good fluidity and good dispersibility to resin particles and having improved cohesion and adhesion to resin particles are easily obtained.

(Resin Particles)

Next, the resin particles will be described.

The resin particles are not particularly limited as long as they have a shape, diameter, and material (component) required for adhering the specific silica particles and the polishing agent particle to the resin particles. The resin particles may be determined depending on the application purpose of the resin particle composition according to the present exemplary embodiment.

The shape of the resin particles is not particularly limited, but the volume average particle diameter of the resin particles is preferably 1 μm to 20 μm, more preferably 2 μm to 15 μm, and further more preferably 3 μm to 10 μm. When the volume average particle diameter of the resin particles is within the above range, the deterioration of fluidity of the resin particle composition is easily prevented.

Here, the volume average particle diameter of the resin particles is measured using a Coulter Multisizer II (manufactured by Beckman Coulter, Inc.). In this measurement, ISOTON-II (manufactured by Beckman Coulter, Inc.) is used for measuring an electrolyte.

In the measurement, 0.5 mg to 50 mg of a measurement sample is added to 2 ml of an aqueous solution containing 5% by weight of a surfactant, such as sodium alkylbenzene sulfonate, as a dispersant. This resultant is added to 100 mL to 150 mL of an electrolyte.

The electrolyte in which the sample has been suspended is dispersion-treated for 1 minute with an ultrasonic dispersing machine, and the particle size distribution of particles within a range of 2 μm to 50 μm is measured using an aperture having a diameter of 100 μm by a Coulter Multisizer II. The number of particles to be sampled is 50,000.

The volume average particle diameter $D_{50V}$ is defined by the particle diameter at 50% cumulative volume when drawing the cumulative distribution of the measured particle size distributions with respect to the divided particle size ranges (channels) from small diameter for volume. Specifically, the volume average particle diameter $D_{50V}$ is obtained as follows. The volume average particle diameter $D_{50V}$ at 50% cumulative volume is obtained by drawing a cumulative distribution using the volume distribution obtained by image analysis.

The resin constituting the resin particles is not particularly limited. As the resin constituting the resin particles, thermoplastic resins made of various natural or synthetic polymer materials may be used.

Examples of the resin include polyolefin resins, such as polyethylene and polypropylene; polystyrene resins, such as polystyrene and a acrylonitrile/butadiene/styrene copolymer (ABS resin); acrylic resins, such as polymethyl methacrylate and polybutyl acrylate; rubbery (co)polymers, such as polybutadiene and polyisoprene; polyester resins, such as polyethylene terephthalate and polybutylene terephthalate; vinyl resins, such as vinyl chloride resin, vinyl aromatic resin, and polyvinyl resin; epoxy resins; conjugated diene resins; polyamide resins; polyacetal resins; polycarbonate resins; thermoplastic polyurethane resins; and fluorine resins.

These resins may be used alone or as a mixture of two or more thereof.

As the resin constituting the resin particles, typically, resins having a weight average molecular weight of 5,000 to 100,000 (for example, epoxy resins, styrene-acrylate resins, polyamide resins, polyester resins, polyvinyl resins, polyolefin resins, polyurethane resins, and polybutadiene resins) are exemplified. These resins may be used alone or as a mixture of two or more thereof.

The resin particles may further contain an additive, such as an ultraviolet absorber or an antioxidant, depending on the intended use.

Polishing Agent Particles

Next, the polishing agent particles (particles of a polishing agent) will be described.

The average circle-equivalent diameter of the polishing agent particles, from the viewpoint of adhesion to resin particles (particularly, from the viewpoint of preventing the clogging in the pipe and the mixing of coarse powder when transporting the resin particle composition by air), is 0.1 μm to 3.0 μm, preferably 0.2 μm to 2.0 μm, and more preferably 0.3 μm to 1.0 μm.

The ratio (Da/Dsi) of the average circle-equivalent diameter (Da) of the polishing agent particles to the average circle-equivalent diameter (Dsi) of the silica particles is preferably from 0.5 to 75.

As the polishing agent particles, particles of well known polishing agents are exemplified.

Specific examples of the polishing agent particles include inorganic particles, such as cerium oxide particles, strontium titanate particles, magnesium oxide particles, aluminum oxide (alumina) particles, silicon carbide particles, zinc oxide particles, silica particles, titanium oxide particles, boron nitride particles, calcium pyrophosphate particles, zirconia particles, barium titanate particles, calcium titanate particles, calcium carbonate particles, and strontium titanate particles. These polishing agent particles may be used alone or as a combination of two or more thereof.

The surface of the polishing agent particles, for example, may be hydrophobically treated with a hydrophobizing agent. As the hydrophobizing agent, for example, a well known organic silicon compound having an alkyl group (for example, a methyl group, an ethyl group, a propyl group, or a butyl group) is exemplified, and specific examples thereof include silazane compounds (for example, silane compounds, such as methyltrimethoxysilane, dimethyldimethoxysilane, trimethylchlorosilane, and trimethylmethoxysilane; hexamethyldisilazane; and tetramethyldisilazane). These hydrophobizing agents may be used alone or as a combination of two or more thereof.

The average circle-equivalent diameter of the polishing agent particles is a value measured by the following method.

The polishing agent particles are separated from the resin particle composition, and the average circle-equivalent diameter of the polishing agent particles is measured in the same manner as the above-described measurement method of the average circle-equivalent diameter of the specific silica particles.

The method of separating the specific silica particles and the polishing agent particles from the resin particle composition is performed by the above-described method. That is, the resin particle composition is dispersed in methanol, stirred, and then ultrasonically treated with an ultrasonic bath by setting the ultrasonic treatment condition to a weak condition or precipitating the resin particle composition by the centrifugation which is weak to such a degree that the resin particle composition is not precipitated, so as to separate the polishing agent particles.

Then, the above characteristics are measured using the separated polishing agent particles.

Configuration of Resin Particle Composition

It is preferable that the content of specific silica particles in the resin particle composition and the content of polishing agent particles in the resin particle composition, from the viewpoint of preventing the clogging in the pipe when transporting the resin particle composition by air, are within the following ranges, respectively.

The content of the specific silica particles is preferably 0.1 parts by weight to 6 parts by weight, more preferably 0.3 parts by weight to 4 parts by weight, and further more preferably 0.5 parts by weight to 2.5 parts by weight, with respect to 100 parts by weight of the resin particles.

The content of the polishing agent particles is preferably 0.01 parts by weight to 2 parts by weight, more preferably 0.015 parts by weight to 1.6 parts by weight, and further more preferably 0.02 parts by weight to 1.5 parts by weight, with respect to 100 parts by weight of the resin particles.

Method of Preparing Resin Particle Composition

The resin particle composition according to the present exemplary embodiment, for example, is prepared by the following method.

The resin particle composition according to the present exemplary embodiment is obtained by a preparation method, the method including: a process of providing resin particles, polishing agent particles, and specific silica particles (hereinafter, referred to as a "particle providing process"); and a process of mixing the resin particles, polishing agent particles, and specific silica particles provided in the particle providing process (hereinafter, referred to as a "particle mixing process").

Particle Providing Process

First, in the particle providing process, resin particles, polishing agent particles, and specific silica particles, which are to be contained in the resin particle composition according to the present exemplary embodiment, are provided.

Here, as the specific silica particles, commercially available silica particles satisfying the above-described compression aggregation degree and particle compression ratio may be provided, and silica particles prepared so as to satisfy the above-described compression aggregation degree and particle compression ratio may also be provided. In the case where the silica particles prepared in this way are provided as the specific silica particles, this preparation method is not particularly limited, but, for example, the resin particle composition may be prepared by processes to be described below.

Further, as the polishing agent particles and the resin particles, commercially available products may be provided, and the particles prepared in this way may also be provided.

Preparation of Specific Silica Particles

The specific silica particles are obtained by surface-treating the surface of silica particles with a siloxane compound having a viscosity of 1,000 cSt to 50,000 cSt such that the surface attachment amount to the silica particles is 0.01% by weight to 5% by weight.

According to the silica particle providing process, silica particles having good fluidity and dispersibility to resin particles and having improved cohesion and adhesion to resin particles are obtained.

As the surface treatment method, a method of surface-treating the surface of silica particles with a siloxane compound in supercritical carbon dioxide and a method of surface-treating the surface of silica particles with a siloxane compound in the air are exemplified.

Specific examples of the surface treatment method include: a method of adhering a siloxane compound to the surface of silica particles using supercritical carbon dioxide by dissolving the siloxane compound in supercritical carbon dioxide; a method of adhering a siloxane compound to the surface of silica particles by applying (for example, spraying or coating) a solution including a siloxane compound and a solvent dissolving the siloxane compound to the surface of silica particles in the air; and a method of adding a solution including a siloxane compound and a solvent dissolving the siloxane compound to a silica particle dispersion and then drying a mixed solution of the silica particle dispersion and the solution.

Here, the "supercritical carbon dioxide" is carbon dioxide existing in the state of temperature and pressure equal to or more than the critical point, and has both diffusivity of gas and solubility of liquid.

Among these surface treatment methods, a method of adhering a siloxane compound to the surface of silica particles using supercritical carbon dioxide is preferable.

When the surface treatment is performed in supercritical carbon dioxide, there becomes a state in which the siloxane compound is dissolved in the supercritical carbon dioxide. Since the supercritical carbon dioxide has low interfacial tension, it is considered that the siloxane compound existing in the state of being dissolved in the supercritical carbon dioxide diffuses deeply into the holes of the surface of silica particles together with supercritical carbon dioxide to easily reach the hole, and it is considered that the surface treatment with the siloxane compound is performed in the hole as well as on the surface of silica particles.

Therefore, it is considered that the silica particles surface-treated with the siloxane compound in the supercritical carbon dioxide are silica particles treated in a state of the surface thereof being substantially uniform (for example, in a state of a surface treated layer being formed in the shape of a thin film).

Further, surface treatment of imparting hydrophobicity to the surface of silica particles by using a hydrophobizing agent together with the siloxane compound in the supercritical carbon dioxide may be performed.

In this case, there becomes a state in which both the hydrophobizing agent and the siloxane compound are dissolved in the supercritical carbon dioxide. It is considered that the siloxane compound and hydrophobizing agent existing in the state of being dissolved in the supercritical carbon dioxide diffuse deeply into the holes of the surface of silica particles together with supercritical carbon dioxide to easily reach the hole, and it is considered that the surface treatment with the siloxane compound and the hydrophobizing agent is performed in the hole as well as on the surface of silica particles.

As a result, the silica particles surface-treated with the siloxane compound and the hydrophobizing agent in the supercritical carbon dioxide are easily adhered to the surface of silica particles in a state of the surface thereof being substantially uniform, so as to impart high hydrophobicity to the surface of silica particles.

It is preferable that the specific silica particles are prepared by the following method.

As the method of preparing the specific silica particles, there is exemplified a method of preparing silica particles, including: a process of providing a silica particle dispersion containing silica particles and a solvent including alcohol and water (hereinafter, referred to as "dispersion providing process") by a sol-gel process; removing the solvent from the silica particle dispersion by circulating supercritical carbon dioxide (hereinafter, referred to as "solvent removing process"); and surface-treating the surface of the silica particle with a siloxane compound in the supercritical carbon dioxide after removing the solvent (hereinafter, referred to as "surface treatment process").

As described above, when the process of removing the solvent from the silica particle dispersion is performed using the supercritical carbon dioxide, it is easy to prevent the formation of coarse powder.

The reason for this is not clear, but is considered as follows. 1) In the case of removing the solvent from the silica particle dispersion, since the supercritical carbon dioxide has a property of "interfacial tension not operating", the solvent may be removed without the aggregation of particles by the liquid crosslinking force at the time of removing the solvent, and 2) since the supercritical carbon dioxide is "carbon dioxide existing in the state of temperature and pressure equal to or more than the critical point and has a property of having both diffusivity of gas and solubility of liquid", the silica particle dispersion effectively comes into contact with the supercritical carbon dioxide at a relatively low temperature (for example, 250° C. or lower) to allow the supercritical carbon dioxide in which the solvent is dissolved to be removed, thereby removing the solvent from the silica particle dispersion without the formation of coarse powder, such as secondary aggregates, by the condensation of silanol groups.

Here, the solvent removing process and the surface treatment process may be separately performed, but, preferably, may also be continuously performed (that is, each process is performed in a non-open state to atmospheric pressure). When these processes are continuously performed, the chance of silica particles adsorbing moisture disappears after the solvent removing process, and thus the surface treatment process may be performed in a state in which the adsorption of excess moisture to silica particles is prevented.

Therefore, it is not required to use a large amount of a siloxane compound, and it is not required to perform the solvent removing process and the surface treatment process at high temperature at which excessive heating is performed. As a result, it is easy to prevent the formation of coarse powder more effectively.

Hereinafter, the above-described dispersion providing process, solvent removing process and surface treatment process will be described in detail with respect to each process.

The method of preparing specific silica particles is not limited to a method including the above three processes, and, for example, may be 1) an aspect in which supercritical carbon dioxide is used only in the surface treatment process, or 2) an aspect in which each process is separately performed.

Dispersion Providing Process

In the dispersion providing process, for example, a silica particle dispersion containing silica particles and a solvent including alcohol and water is provided.

Specifically, in the dispersion providing process, for example, a silica particle dispersion is prepared by a wet process (for example, a sol-gel process), and this silica particle dispersion is provided. In particular, silica particles are formed by a sol-gel process as a wet process, specifically, by causing the reactions (hydrolysis reaction and condensation reaction) of tetraalkoxysilane with a solvent of alcohol and water in the presence of an alkali catalyst, and a silica particle dispersion is prepared using these silica particles.

The preferable range of average circle-equivalent diameter of silica particles and the preferable range of average circularity degree thereof have been described as above. It is preferable that silica particles (untreated silica particles) are prepared within these ranges.

In the dispersion providing process, for example, in the case where silica particles are obtained by a wet process, the silica particles are obtained in the form of a dispersion (silica particle dispersion) in which silica particles are dissolved in a solvent.

When the solvent removing process is performed, in the prepared silica particle dispersion, the weight ratio of silica particles to the silica particle dispersion, for example, may be 0.05 to 0.7, preferably 0.2 to 0.65, and more preferably 0.3 to 0.6.

When the weight ratio of silica particles to the silica particle dispersion is below 0.05, the amount of supercritical carbon dioxide used in the solvent removing process increases, and thus productivity deteriorates.

Further, when the weight ratio of silica particles to the silica particle dispersion is above 0.7, the distance between silica particles in the silica particle dispersion decreases, and thus coarse powder is easily formed due to the aggregation or gelation of silica particles.

Solvent Removing Process

The solvent removing process, for example, is a process of removing a solvent from the silica particle dispersion by circulating supercritical carbon dioxide.

That is, in the solvent removing process, supercritical carbon dioxide is brought into contact with the silica particle dispersion by circulating the supercritical carbon dioxide, so as to remove a solvent from the silica particle dispersion.

Specifically, in the solvent removing process, for example, the silica particle dispersion is put into a sealed reactor. Then, liquefied carbon dioxide is introduced into the sealed reactor, the sealed reactor is heated, and then the pressure in the reactor is increased by a high-pressure pump, so as to set the carbon dioxide to a supercritical state. Further, the supercritical carbon dioxide is introduced into the sealed reactor and discharged from the sealed reactor, thereby circulating the supercritical carbon dioxide in the sealed reactor, that is, the silica particle dispersion.

Thus, the supercritical carbon dioxide is discharged to the outside of the silica particle dispersion (outside of the sealed reactor) while dissolving a solvent (alcohol and water), so as to remove the solvent.

The temperature condition for solvent removal, that is, the temperature of the supercritical carbon dioxide may be 31° C. to 350° C., preferably 60° C. to 300° C., and more preferably 80° C. to 250° C.

When this temperature is lower than 31° C., it is difficult to allow the solvent to be dissolved in the supercritical carbon dioxide, and thus it is difficult to remove the solvent. Further, it is considered that coarse powder is easily formed by the liquid crosslinking force of the solvent or the supercritical carbon dioxide. Meanwhile, when this temperature is higher than 350° C., it is considered that coarse powder, such as secondary aggregates, is easily formed by the condensation of silanol groups of the surface of silica particles.

The pressure condition for solvent removal, that is, the pressure of the supercritical carbon dioxide may be 7.38 MPa to 40 MPa, preferably 10 MPa to 35 MPa, and more preferably 15 MPa to 25 MPa.

When this pressure is lower than 7.38 MPa, there is a tendency that it is difficult to allow the solvent to be dissolved in the supercritical carbon dioxide. In contrast, when this pressure is higher than 40 MPa, there is a tendency that equipment cost is high.

The amount of supercritical carbon dioxide introduced into the sealed reactor and discharged from the sealed reactor, for example, may be 15.4 L/min/m$^3$ to 1,540 L/min/m$^3$, and preferably 77 L/min/m$^3$ to 770 L/min/m$^3$.

When the introduction and discharge amount thereof is less than 15.4 L/min/m$^3$, it takes time to remove a solvent, and thus there is a tendency that productivity easily deteriorates. In contrast, when the introduction and discharge amount thereof is more than 1,540 L/min/m$^3$, supercritical carbon dioxide short-passed, so that the contact time of the silica particle dispersion becomes shorter, and thus there is a tendency that it is difficult to efficiently remove a solvent.

Surface Treatment Process

The surface treatment process, for example, is a process of surface-treating the surface of silica particles with a siloxane compound in the supercritical carbon dioxide, successive after the solvent removing process.

That is, in the surface treatment process, for example, before shifting from the solvent removing process, the surface of silica particles is treated with a siloxane compound in the supercritical carbon dioxide without opening to the air.

Specifically, in the surface treatment process, for example, after stopping the introduction of supercritical carbon dioxide into the sealed reactor and the discharge of supercritical carbon dioxide from the sealed reactor in the solvent removing process, the temperature and pressure in the sealed reactor are adjusted, and a siloxane compound is put into the sealed reactor at a predetermined ratio to silica particles in a state in which the supercritical carbon dioxide existing in the sealed reactor. Then, the surface treatment of silica particles is performed by reacting a siloxane compound with silica particles while maintaining this state, that is, in the supercritical carbon dioxide.

Here, in the surface treatment process, the reaction of a siloxane compound may be performed in the supercritical carbon dioxide (that is, under an atmosphere of supercritical carbon dioxide), and surface treatment may be performed while circulating supercritical carbon dioxide (that is, while introducing supercritical carbon dioxide into the sealed reactor and discharging the supercritical carbon dioxide from the sealed reactor) and may also be performed without circulating.

In the surface treatment process, the amount (that is, charged amount) of silica particles with respect to the volume of the reactor, for example, may be 30 g/L to 600 g/L, preferably 50 g/L to 500 g/L, and more preferably 80 g/L to 400 g/L.

When the amount thereof is less than 30 g/L, the concentration of a siloxane compound to supercritical carbon dioxide is decreased to decrease the probability of contact with silica surface, and thus reaction is less likely to proceed. In contrast, when the amount thereof is more than 600 g/L, the concentration of a siloxane compound to supercritical carbon dioxide is increased, so that the siloxane compound is not completely dissolved in the supercritical carbon dioxide to cause poor dispersion, and thus coarse aggregates are easily formed.

The density of supercritical carbon dioxide, for example, may be 0.10 g/mL to 0.80 g/mL, preferably 0.10 g/mL to 0.60 g/mL, and more preferably 0.2 g/mL to 0.50 g/mL.

When the density thereof is lower than 0.10 g/mL, the solubility of a siloxane compound to supercritical carbon dioxide is decreased, and thus there is a tendency to form aggregates. In contrast, when the density thereof is higher than 0.80 g/mL, the diffusivity of silica particles into holes is deteriorated, and thus there is a case where surface treatment becomes insufficient. Particularly, the surface treatment of sol-gel silica particles containing many silanol groups may be performed within the above density range.

The density of supercritical carbon dioxide is adjusted by temperature, pressure, and the like.

The temperature condition for surface treatment, that is, the temperature of the supercritical carbon dioxide may be 80° C. to 300° C., preferably 100° C. to 250° C., and more preferably 120° C. to 200° C.

When the temperature thereof is lower than 80° C., the surface treatment capacity by a siloxane compound is deteriorated. In contrast, when the temperature thereof is higher than 300° C., the condensation reaction between silanol groups of silica particles proceeds, and thus particle aggregation occurs. Particularly, the surface treatment of sol-gel silica particles containing many silanol groups may be performed within the above temperature range.

The pressure condition for surface treatment, that is, the pressure of the supercritical carbon dioxide, for example, may be 8 MPa to 30 MPa, preferably 10 MPa to 25 MPa, and more preferably 15 MPa to 20 MPa, as long as the pressure condition is a condition satisfying the above density.

Specific examples of the siloxane compound used in the surface treatment have been described as above. Further, the preferable range of viscosity of the siloxane compound has also been described as above.

Among the above siloxane compounds, when silicone oil is applied, the silicone oil easily adheres to the surface of silica particles in an almost uniform state, and thus the fluidity, dispersibility and treatability of silica particles are easily improved.

The amount of the siloxane compound to be used, from the viewpoint of easily controlling the surface attachment amount of the siloxane compound to silica particles within the range of 0.01% by weight to 5% by weight, for example, may be 0.05% by weight to 3% by weight, preferably 0.1% by weight to 2% by weight, and more preferably 0.15% by weight to 1.5% by weight, with respect to the silica particles.

The siloxane compound may be used alone, but may be used as a mixed solution in which the siloxane compound is mixed with a solvent easily dissolving the siloxane compound. Examples of the solvent include toluene, methyl ethyl ketone, and methyl isobutyl ketone.

In the surface treatment process, the surface treatment of silica particles may be performed by a mixture including a hydrophobizing agent together with the siloxane compound.

As the hydrophobizing agent, for example, a silane hydrophobizing agent is exemplified. As the silane hydrophobizing agent, a known silicon compound having an alkyl group (for example, a methyl group, an ethyl group, a propyl group, or a butyl group) is exemplified, and specific examples thereof include silazane compounds (for example, silane compounds, such as methyltrimethoxysilane, dimethyldimethoxysilane, trimethylchlorosilane, and trimethylmethoxysilane; hexamethyldisilazane; and tetramethyldisilazane). These hydrophobizing agents may be used alone, and may also be used in a combination of two or more thereof.

Among the silane hydrophobizing agents, a silicon compound having a trimethyl group, such as trimethylmethoxysilane or hexamethyldisilazane (HMDS), particularly, hexamethyldisilazane (HMDS) is preferable.

The amount of the hydrophobizing agent to be used is not particularly limited, but, for example, may be 1% by weight to 100% by weight, preferably 3% by weight to 80% by weight, and more preferably 5% by weight to 50% by weight, with respect to the silica particles.

The hydrophobizing agent may be used alone, but may be used as a mixed solution in which the silane hydrophobizing agent is mixed with a solvent easily dissolving the silane hydrophobizing agent. Examples of the solvent include toluene, methyl ethyl ketone, and methyl isobutyl ketone.

Preparation of Polishing Agent Particles

In the case of preparing polishing agent particles, the method of preparing polishing agent particles is not particularly limited, and a well known method preparing polishing agent particles may be employed.

Preparation of Resin Particles

In the case of preparing resin particles, the method of preparing resin particles is not particularly limited. For example, the resin particles may be prepared by a method of molten-kneading a resin and then pulverizing and classifying the molten-kneaded resin (kneading pulverization method), a method of suspending and dispersing an oil phase, obtained by dissolving a resin in a water-soluble organic solvent, in an aqueous phase containing a dispersant and then removing the solvent (dissolution suspension method), or a method of aggregating a resin, obtained by the emulsion polymerization of resin monomers, and then making the resin aggregates into particles (emulsion polymerization aggregation method).

In the case where the resin particles contain the above components, such as inorganic particles, each of the above components may be mixed with a resin in advance. In the case of the emulsion polymerization aggregation method, emulsion polymerization may be performed after mixing resin monomers with each of the above components.

Particle Mixing Process

The particle mixing process is a process of mixing the resin particles, polishing agent particles, and specific silica particles, which are provided in the particle providing process. Through the process, the polishing agent particles and the specific silica particles are adhered to the resin particles.

As the method of mixing the resin particles, polishing agent particles and specific silica particles, there is exemplified a method of introducing the particles into a V-type blender, a HENSCHEL MIXER, or a LÖDIGE MIXER and then stirring these particles. All of the resin particles, polishing agent particles and specific silica particles may be mixed with each other at once, and the specific silica particles and polishing agent particles may be stepwisely mixed with respect to the total amount of the resin particles.

As described above, in the resin particle composition, the content of the specific silica particles is preferably 0.1 parts by weight to 6 parts by weight with respect to 100 parts by weight of the resin particles, and the content of the polishing agent particles is preferably 0.01 parts by weight to 2 parts by weight with respect to 100 parts by weight of the resin particles. It is preferable to mix the resin particles, polishing agent particles and specific silica particles within the above ranges, in terms of preventing the clogging in the pipe and the mixing of coarse powder when transporting the resin particle composition by air.

EXAMPLES

Hereinafter, the present invention will be described in more detail with reference to Examples. However, the present invention is not limited to these Examples. Here, "parts" and "%" are based on weight, unless otherwise specified.

Preparation of Silica Particle Dispersion (1)

300 parts of methanol and 70 parts of 10% aqueous ammonia are put into a 1.5 L glass reaction container provided with a stirrer, a dropping nozzle, and a thermometer, and mixed with each other, so as to obtain an alkali catalyst solution.

The temperature of the alkali catalyst solution is adjusted to 30° C., and then 185 parts of tetramethoxysilane and 50 parts of 8.0% aqueous ammonia are simultaneously dropped thereinto while stirring, so as to obtain a hydrophilic silica particle dispersion (solid concentration: 12.0% by weight). Here, dropping time is set to 30 minutes.

Thereafter, the obtained silica particle dispersion is concentrated to have a solid concentration of 40% by weight by a rotary filter R-FINE (manufactured by KOTOBUKI Industry Co., Ltd.). This concentrated product is denoted as silica particle dispersion (1).

Preparation of Silica Particle Dispersions (2) to (8)

Silica particle dispersions (2) to (8) are prepared in the same manner as in the preparation of the silica particle dispersion (1), except that the alkali catalyst solution (content of methanol and content of 10% aqueous ammonia) and silica particle formation conditions (total dropping amount of tetramethoxysilane (represented by TMOS) into the alkali catalyst solution, total dropping amount of 8% aqueous ammonia into the alkali catalyst solution, and dropping time) are changed according to Table 1.

Silica particle dispersions (1) to (8) are summarized in Table 1.

TABLE 1

| | Alkali catalyst solution | | Silica particle formation condition | | |
|---|---|---|---|---|---|
| Silica particle dispersion | Methanol (parts) | 10% aqueous ammonia (parts) | Total dropping amount of TMOS (parts) | Total dropping amount of 8% aqueous ammonia (parts) | Dropping time (min) |
| (1) | 300 | 70 | 185 | 50 | 30 |
| (2) | 300 | 70 | 340 | 92 | 55 |

TABLE 1-continued

| | Alkali catalyst solution | | Silica particle formation condition | | |
|---|---|---|---|---|---|
| Silica particle dispersion | Methanol (parts) | 10% aqueous ammonia (parts) | Total dropping amount of TMOS (parts) | Total dropping amount of 8% aqueous ammonia (parts) | Dropping time (min) |
| (3) | 300 | 46 | 40 | 25 | 30 |
| (4) | 300 | 70 | 62 | 17 | 10 |
| (5) | 300 | 70 | 700 | 200 | 120 |
| (6) | 300 | 70 | 500 | 140 | 85 |
| (7) | 300 | 70 | 1,000 | 280 | 170 |
| (8) | 300 | 70 | 3,000 | 800 | 520 |

Preparation of Surface-Treated Silica Particles (S1)

The surface treatment of silica particles with a siloxane compound is performed under supercritical carbon dioxide atmosphere using the silica particle dispersion (1) as follows. In the surface treatment, an apparatus equipped with a carbon dioxide cylinder, a carbon dioxide pump, an entrainer pump, a stirrer-equipped autoclave (capacity: 500 mL), and a pressure valve is used.

First, 250 parts of the silica particle dispersion (1) is put into the stirrer-equipped autoclave (capacity: 500 mL), and the stirrer is rotated at 100 rpm. Then, liquefied carbon dioxide is injected into the autoclave, and the pressure in the autoclave is increased by the carbon dioxide pump while increasing the temperature in the autoclave by a heater, so as to set the inside of the autoclave to a supercritical state of 150° C. and 15 MPa. Then, methanol and water are removed from the silica particle dispersion (1) by circulating supercritical carbon dioxide using the carbon dioxide pump while maintaining the pressure in the autoclave at 15 MPa using the pressure valve (solvent removing process), so as to obtain silica particles (untreated silica particles).

Next, the circulation of supercritical carbon dioxide is stopped at the time that the circulation amount of circulated supercritical carbon dioxide (accumulated amount are measured as the circulation amount of carbon dioxide in the standard state) becomes 900 parts.

Then, in a state in which the temperature is maintained at 150° C. by the heater, the pressure is maintained at 15 MPa by the carbon dioxide pump, and the supercritical state of carbon dioxide in the autoclave is maintained, a treatment agent solution, which is obtained in advance by dissolving 0.3 parts of dimethyl silicone oil (DSO: trade name "KF-96", manufactured by Shin-Etsu Chemical Co., Ltd.) having a viscosity of 10,000 cSt, as a siloxane compound, in 20 parts of hexamethyldisilazane (HMDS, manufactured by YUKI GOSEI KOGYO CO., LTD.), as a hydrophobizing agent, is injected into the autoclave by the entrainer pump, and then reacted with respect to 100 parts of the above silica particles (untreated silica particles) for 20 minutes at 180° C. with stirring. Then, the supercritical carbon dioxide is circulated again, so as to remove the excess treatment agent solution. Then, stirring is stopped, the pressure in the autoclave is reduced to atmospheric pressure by opening the pressure valve, and the temperature in the autoclave is reduced to room temperature (25° C.)

As such, the solvent removing process and the surface treatment with the siloxane compound are sequentially performed, so as to obtain surface-treated silica particles (S1).

Preparation of surface-treated silica particles (S2) to (S5), (S7) to (S9), and (S12) to (S17)

Surface-treated silica particles (S2) to (S5), (S7) to (S9), and (S12) to (S17) are prepared in the same manner as in the preparation of the surface-treated silica particles (S1), except that silica particle dispersion and surface treatment condition (treatment atmosphere, siloxane compound (kind, viscosity, and addition amount), and hydrophobizing agent and addition amount thereof) are changed according to Table 2.

Preparation of Surface-Treated Silica Particles (S6)

The surface treatment of silica particles with a siloxane compound is performed under the air atmosphere using a dispersion which is the same as the silica particle dispersion (1) used in the preparation of the surface-treated silica particles (S1) as follows.

An ester adapter and a cooling tube are mounted in the reaction container used in the preparation of the silica particle dispersion (1), the silica particle dispersion (1) is heated to 60° C. to 70° C. to remove methanol, water is added thereto, and this dispersion is further heated to 70° C. to 90° C. to remove methanol, so as to obtain an aqueous dispersion of silica particles. 3 parts of methyl trimethoxysilane (MTMS, manufactured by Shin-Etsu Chemical Co., Ltd.) is added at room temperature with respect to 100 parts of solid content of silica particles in the aqueous dispersion, and a reaction is performed for 2 hours, so as to perform the surface treatment of silica particles. Methyl isobutyl ketone is added to the surface-treated dispersion, and then the dispersion is heated to 80° C. to 110° C. to remove methanol. Then, 80 parts of hexamethyldisilazane (HMDS, manufactured by YUKI GOSEI KOGYO CO., LTD.) and 1.0 part of dimethyl silicone oil (DSO: trade name "KF-96", manufactured by Shin-Etsu Chemical Co., Ltd.) having a viscosity of 10,000 cSt, as a siloxane compound, are added at room temperature with respect to 100 parts of solid content of silica particles in the obtained dispersion, followed by a reaction at 120° C. for 3 hours, cooling, and drying by spray drying, so as to obtain surface-treated silica particles (S6).

Preparation of Surface-Treated Silica Particles (S10)

Surface-treated silica particles (S10) are prepared in the same manner as in the preparation of the surface-treated silica particles (S1), except that fumed silica ("AEROSIL OX50", manufactured by Nippon Aerosil Co., Ltd.) is used instead of the silica particles (untreated silica particles) obtained by removing methanol and water from the silica particle dispersion (1).

That is, 100 parts of AEROSIL OX50 is put into the stirrer-equipped autoclave, which is the same as that used in the preparation of the surface-treated silica particles (S1), and the stirrer is rotated at 100 rpm. Then, liquefied carbon dioxide is injected into the autoclave, and the pressure in the autoclave is increased by the carbon dioxide pump while increasing the temperature in the autoclave by a heater, so as to set the inside of the autoclave to a supercritical state of 180° C. and 15 MPa. Then, in a state in which the pressure in the autoclave is maintained at 15 MPa by the pressure valve, a treatment agent solution, which is obtained in advance by dissolving 0.3 parts of dimethyl silicone oil (DSO: trade name "KF-96", manufactured by Shin-Etsu Chemical Co., Ltd.) having a viscosity of 10,000 cSt, as a siloxane compound, in 20 parts of hexamethyldisilazane (HMDS, manufactured by YUKI GOSEI KOGYO CO., LTD.), as a hydrophobizing agent, is injected into the autoclave by the entrainer pump, followed by a reaction for 20 minutes at 180° C. with stirring. Then, the supercritical carbon dioxide is circulated to remove excess treatment agent solution, so as to obtain surface-treated silica particles (S10).

Preparation of Surface-Treated Silica Particles (S11)

Surface-treated silica particles (S11) are prepared in the same manner as in the preparation of the surface-treated silica particles (S1), except that fumed silica ("AEROSIL A50", manufactured by Nippon Aerosil Co., Ltd.) is used instead of the silica particles (untreated silica particles) obtained by removing methanol and water from the silica particle dispersion (1).

That is, 100 parts of AEROSIL A50 is put into the stirrer-equipped autoclave, which is the same as that used in the preparation of the surface-treated silica particles (S1), and the stirrer is rotated at 100 rpm. Then, liquefied carbon dioxide is injected into the autoclave, and the pressure in the autoclave is increased by the carbon dioxide pump while increasing the temperature in the autoclave by a heater, so as to set the inside of the autoclave to a supercritical state of 180° C. and 15 MPa. Then, in a state in which the pressure in the autoclave is maintained at 15 MPa by the pressure valve, a treatment agent solution, which is obtained in advance by dissolving 1.0 part of dimethyl silicone oil (DSO: trade name "KF-96", manufactured by Shin-Etsu Chemical Co., Ltd.) having a viscosity of 10,000 cSt, as a siloxane compound, in 40 parts of hexamethyldisilazane (HMDS, manufactured by YUKI GOSEI KOGYO CO., LTD.), as a hydrophobizing agent, is injected into the autoclave by the entrainer pump, followed by a reaction for 20 minutes at 180° C. with stirring. Then, the supercritical carbon dioxide is circulated to remove excess treatment agent solution, so as to obtain surface-treated silica particles (S11).

Preparation of Surface-Treated Silica Particles (SC1)

Surface-treated silica particles (SC1) are prepared in the same manner as in the preparation of the surface-treated silica particles (S1), except that a siloxane compound is not added.

Preparation of Surface-Treated Silica Particles (SC2) to (SC4)

Surface-treated silica particles (SC2) to (SC4) are prepared in the same manner as in the preparation of the surface-treated silica particles (S1), except that silica particle dispersion and surface treatment condition (treatment atmosphere, siloxane compound (kind, viscosity, and addition amount), and hydrophobizing agent and addition amount thereof) are changed according to Table 3.

Preparation of Surface-Treated Silica Particles (SC5)

Surface-treated silica particles (SC5) are prepared in the same manner as in the preparation of the surface-treated silica particles (S6), except that a siloxane compound is not added.

Preparation of Surface-Treated Silica Particles (SC6)

The silica particle dispersion (8) is filtered, dried at 120° C., put into an electrical furnace, and then sintered at 400° C. for 6 hours. Then, 10 parts of HMDS is added with respect to 100 parts of silica particles, followed by spray drying, so as to obtain surface-treated silica particles (SC6).

The average circle-equivalent diameter, average circularity degree, amount of siloxane compound adhered to untreated silica particles, compression aggregation degree, particle compression ratio, and particle dispersion degree of the surface-treated silica particles obtained in each example are measured by the above-described method.

TABLE 2

Characteristics of surface-treated silica particles

| Surface-treated silica particle | Silica particle dispersion | Siloxane compound Kind | Viscosity (cSt) | Addition amount (parts) | Treatment atmosphere | Hydrophobizing agent/parts | Average circle equivalent diameter (nm) | Average circularity degree | Surface attachment amount (wt %) | Compression aggregation degree (%) | Particle compression ratio | Particle dispersion degree (%) |
|---|---|---|---|---|---|---|---|---|---|---|---|---|
| (S1) | (1) | DSO | 10,000 | 0.3 | Supercritical CO$_2$ | HMDS/20 parts | 120 | 0.958 | 0.28 | 85 | 0.310 | 98 |
| (S2) | (1) | DSO | 10,000 | 1.0 | Supercritical CO$_2$ | HMDS/20 parts | 120 | 0.958 | 0.98 | 92 | 0.280 | 97 |
| (S3) | (1) | DSO | 5,000 | 0.15 | Supercritical CO$_2$ | HMDS/20 parts | 120 | 0.958 | 0.12 | 80 | 0.320 | 99 |
| (S4) | (1) | DSO | 5,000 | 0.5 | Supercritical CO$_2$ | HMDS/20 parts | 120 | 0.958 | 0.47 | 88 | 0.295 | 98 |
| (S5) | (2) | DSO | 10,000 | 0.2 | Supercritical CO$_2$ | HMDS/20 parts | 140 | 0.962 | 0.19 | 81 | 0.360 | 99 |
| (S6) | (1) | DSO | 10,000 | 1.0 | Atmosphere | HMDS/80 parts | 120 | 0.958 | 0.50 | 83 | 0.380 | 93 |
| (S7) | (3) | DSO | 10,000 | 0.3 | Supercritical CO$_2$ | HMDS/20 parts | 130 | 0.850 | 0.29 | 68 | 0.350 | 92 |
| (S8) | (4) | DSO | 10,000 | 0.3 | Supercritical CO$_2$ | HMDS/20 parts | 90 | 0.935 | 0.29 | 94 | 0.390 | 95 |
| (S9) | (1) | DSO | 50,000 | 1.5 | Supercritical CO$_2$ | HMDS/20 parts | 120 | 0.958 | 1.25 | 95 | 0.240 | 91 |
| (S10) | Fumed silica OX50 | DSO | 10,000 | 0.3 | Supercritical CO$_2$ | HMDS/20 parts | 80 | 0.680 | 0.26 | 84 | 0.395 | 92 |
| (S11) | Fumed silica A50 | DSO | 10,000 | 1.0 | Supercritical CO$_2$ | HMDS/40 parts | 45 | 0.740 | 0.91 | 88 | 0.396 | 91 |
| (S12) | (3) | DSO | 5,000 | 0.04 | Supercritical CO$_2$ | HMDS/20 parts | 130 | 0.850 | 0.02 | 62 | 0.360 | 96 |
| (S13) | (3) | DSO | 1,000 | 0.5 | Supercritical CO$_2$ | HMDS/20 parts | 130 | 0.850 | 0.46 | 90 | 0.380 | 92 |
| (S14) | (3) | DSO | 10,000 | 5.0 | Supercritical CO$_2$ | HMDS/20 parts | 130 | 0.850 | 4.70 | 95 | 0.360 | 91 |
| (S15) | (5) | DSO | 10,000 | 0.5 | Supercritical CO$_2$ | HMDS/20 parts | 185 | 0.971 | 0.43 | 61 | 0.209 | 96 |
| (S16) | (6) | DSO | 10,000 | 0.5 | Supercritical CO$_2$ | HMDS/20 parts | 164 | 0.970 | 0.41 | 64 | 0.224 | 97 |
| (S17) | (7) | DSO | 10,000 | 0.5 | Supercritical CO$_2$ | HMDS/20 parts | 210 | 0.978 | 0.44 | 60 | 0.205 | 98 |

TABLE 3

Characteristics of surface-treated silica particles

| Surface-treated silica particle | Silica particle dispersion | Siloxane compound Kind | Viscosity (cSt) | Addition amount (parts) | Treatment atmosphere | Hydrophobizing agent/parts | Average circle equivalent diameter (nm) | Average circularity degree | Surface attachment amount (wt %) | Compression aggregation degree (%) | Particle compression ratio | Particle dispersion degree (%) |
|---|---|---|---|---|---|---|---|---|---|---|---|---|
| (SC1) | (1) | — | — | — | Supercritical CO$_2$ | HMDS/20 parts | 120 | 0.958 | — | 55 | 0.415 | 99 |
| (SC2) | (1) | DSO | 100 | 3.0 | Supercritical CO$_2$ | HMDS/20 parts | 120 | 0.958 | 2.5 | 98 | 0.450 | 75 |
| (SC3) | (1) | DSO | 1,000 | 8.0 | Supercritical CO$_2$ | HMDS/20 parts | 120 | 0.958 | 7.0 | 99 | 0.360 | 83 |
| (SC4) | (3) | DSO | 3,000 | 10.0 | Supercritical CO$_2$ | HMDS/20 parts | 130 | 0.850 | 8.5 | 99 | 0.380 | 85 |
| (SC5) | (1) | — | — | — | Atmosphere | HMDS/80 parts | 120 | 0.958 | — | 62 | 0.425 | 98 |
| (SC6) | (8) | — | — | — | Atmosphere | HMDS/10 parts | 300 | 0.980 | — | 60 | 0.197 | 93 |

Preparation of Resin Particles (A)

23 mol % of dimethyl terephthalate, 10 mol % of isophthalic acid, 15 mol % of dodecenyl succinic anhydride, 3 mol % of trimellitic anhydride, 5 mol % of ethylene oxide 2 mol adduct of bisphenol A, and 45 mol % of propylene oxide 2 mol adduct of bisphenol A are put into a reaction container equipped with a stirrer, a thermometer, a condenser, and a nitrogen gas inlet pipe, the reaction container is purged with dry nitrogen gas, 0.06 mol % of dibutyl tin oxide, as a catalyst, is added thereto, followed by a stirring reaction at about 190° C. for about 7 hours under a nitrogen gas stream. Then, temperature increases to about 250° C., and then a stirring reaction is further performed for about 5.0 hours. Then, the pressure in the reaction container is reduced to 10.0 mmHg, followed by a stirring reaction for about 0.5 hours under reduced pressure, so as to obtain a polyester resin having a polar group in a molecule thereof.

Next, 100 parts of the polyester resin is molten-kneaded by a Banbury mixer type kneader. The kneaded product is molded in the form of a plate having a thickness of about 1 cm by rolling roll, coarsely pulverized to several millimeters by a Fitz mill type pulverizer, finely pulverized by an IDS type pulverizer, and then sequentially classified by an elbow type classifier, so as to obtain resin particles (A) having a volume average particle diameter of 7 μm.

Preparation of Resin Particles (B) and (C)

In the preparation of the resin particles (A), classifications are sequentially performed by the elbow type classifier, so as to obtain resin particles (B) having a volume average particle diameter of 1 μm and resin particles (C) having a volume average particle diameter of 15 μm.

Preparation of Resin Particles (D)

Resin particles (D) having a volume average particle diameter of 8 μm are obtained by performing classification in the same manner as in the preparation of the resin particles (A), except that a styrene-butylacrylate copolymer (copolymerization ratio (weight ratio)=80:20, weight average molecular weight Mw=130,000, glass transition temperature Tg=59° C.) is used instead of the polyester resin in the preparation of resin particle (A).

Providing of Polishing Agent Particles (a) to (f)

As the polishing agent particles, the following polishing agent particles are provided.

Polishing agent particles (a): strontium titanate particles (average circle-equivalent diameter: 0.51 μm)

Polishing agent particles (b): strontium titanate particles (average circle-equivalent diameter: 1.22 μm)

Polishing agent particles (c): cerium oxide particles (average circle-equivalent diameter: 0.24 μm)

Polishing agent particles (d): aluminum oxide particles (average circle-equivalent diameter: 0.15 μm)

Polishing agent particles (e): strontium titanate particles (average circle-equivalent diameter: 3.3 μm)

Polishing agent particles (f): aluminum oxide particles (average circle-equivalent diameter: 0.087 μm)

Example 1

100 parts of resin particles (A), 0.1 parts of polishing agent particles (a), and 2.0 parts of surface-treated silica particles (S1), which are obtained by the above preparation methods, are added. Then, these particles are mixed with each other by a 1,000 L HENSCHEL MIXER at 900 rpm for 10 minutes, and then sieved by a mesh net of 45 μm, so as to obtain a resin particle composition of Example 1.

Examples 2 to 25 and Comparative Examples 1 to 9

Resin particle compositions of Examples 2 to 25 and Comparative Examples 1 to 9 are obtained in the same manner as in Example 1, except that the kind and amount of surface-treated silica, the kind of resin particles, and the kind and amount of polishing agent particles are changed according to Tables 4 and 5.

Evaluation of Resin Particle Compositions

The amounts attached to the pipe of the resin particle compositions obtained in Examples 1 to 25 and Comparative Examples 1 to 9 are evaluated by the following method. The results thereof are summarized in Tables 4 and 5.

Evaluation of Pipe Clogging Degree and Coarse Powder Amount

A SUS 304-made test pipe having an inner diameter ϕ of 23 mm, a length of 10 m, and an elbow portion of R90° located at 5 m from an inlet is prepared, and the resin particle composition is transported by air from an outlet through a filter using a blower as a powder suction test. At that time, 100 kg of the resin particle composition is transported under conditions of an in-pipe linear speed of 21.6 m/min and a solid-gas ratio of 1.0 and collected. This collected resin particle composition is repeatedly transported nine times in the same manner through the same pipe, 100 g of the collected material after the test is sieved by a net of 45 μm, and then the evaluation of pipe clogging degree and coarse powder amount is performed based on the following criteria.

Here, a case of the amount of coarse powder of 45 μm or more being 0.5% by weight or more is determined as unallowable.

In the case where the pipe is clogged during the test, the evaluation is stopped.

Evaluation Criteria

A: coarse powder is not visually observed on the net

B: coarse powder is visually observed on the net, but disappears by brushing (coarse powder is not molten-attached)

C: coarse powder on the net slightly remains even after brushing (less than 0.1% by weight)

D: the amount of coarse powder remaining on the net after brushing is 0.1% by weight or more and less than 0.5% by weight E: the amount of coarse powder remaining on the net after brushing is 0.5% by weight or more

TABLE 4

| | Resin particle No. | Surface-treated silica particle No. | | Polishing agent particle | | Evaluation | |
|---|---|---|---|---|---|---|---|
| | | | Parts | No. | Parts | Coarse powder amount (wt %) | Determination |
| Example 1 | A | (S1) | 2 | (a) | 0.1 | none | A |
| Example 2 | A | (S2) | 2 | (a) | 0.1 | none | A |
| Example 3 | A | (S3) | 2 | (a) | 0.1 | none | A |
| Example 4 | A | (S4) | 2 | (a) | 0.1 | none | A |
| Example 5 | A | (S5) | 2 | (a) | 0.1 | none | A |
| Example 6 | A | (S6) | 2 | (a) | 0.1 | Only aggregated | B |
| Example 7 | A | (S7) | 2 | (a) | 0.1 | Only aggregated | B |
| Example 8 | A | (S8) | 2 | (a) | 0.1 | 0.04 | C |
| Example 9 | A | (S9) | 2 | (a) | 0.1 | Only aggregated | B |
| Example 10 | A | (S10) | 2 | (a) | 0.1 | 0.02 | C |
| Example 11 | A | (S11) | 2 | (a) | 0.1 | 0.06 | C |
| Example 12 | A | (S12) | 2 | (a) | 0.1 | 0.04 | C |
| Example 13 | A | (S13) | 2 | (a) | 0.1 | Only aggregated | B |
| Example 14 | A | (S14) | 2 | (a) | 0.1 | none | A |
| Example 15 | A | (S15) | 2 | (a) | 0.1 | 0.23 | D |
| Example 16 | A | (S16) | 2 | (a) | 0.1 | 0.36 | D |
| Example 17 | A | (S17) | 2 | (a) | 0.1 | 0.15 | D |
| Example 18 | B | (S1) | 2 | (a) | 0.1 | none | A |
| Example 19 | C | (S1) | 2 | (a) | 0.1 | none | A |
| Example 20 | D | (S1) | 2 | (a) | 0.1 | none | A |
| Example 21 | A | (S1) | 2 | (b) | 0.1 | Only aggregated | B |
| Example 22 | A | (S1) | 2 | (c) | 0.1 | Only aggregated | B |
| Example 23 | A | (S1) | 2 | (d) | 0.1 | 0.07 | C |
| Example 24 | A | (S1) | 0.1 | (a) | 0.01 | 0.09 | C |
| Example 25 | A | (S1) | 6 | (a) | 2 | 0.04 | C |

TABLE 5

| | Resin particle No. | Surface-treated silica particle No. | Parts | Polishing agent particle No | Parts | Evaluation Coarse powder amount (wt %) | Determination |
|---|---|---|---|---|---|---|---|
| Comparative Example 1 | A | (SC1) | 2 | (a) | 0.1 | — | Clogging occurred at seventh time |
| Comparative Example 2 | A | (SC2) | 2 | (a) | 0.1 | — | Clogging occurred at eighth time |
| Comparative Example 3 | A | (SC3) | 2 | (a) | 0.1 | 5.12 | E |
| Comparative Example 4 | A | (SC4) | 2 | (a) | 0.1 | 4.77 | E |
| Comparative Example 5 | A | (SC5) | 2 | (a) | 0.1 | — | Clogging occurred at ninth time |
| Comparative Example 6 | A | (SC6) | 2 | (a) | 0.1 | — | Clogging occurred at third time |
| Comparative Example 7 | A | (S1) | 2 | (e) | 0.1 | 1.55 | E |
| Comparative Example 8 | A | (S1) | 2 | (f) | 0.1 | 2.68 | E |
| Comparative Example 9 | A | (S1) | 2 | — | — | Accurate measurement impossible due to net clogging 8 time or more | E |

From the above results, it is found that Examples obtain good results in the evaluation of pipe clogging and coarse powder mixing, compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin particle composition, comprising:
   resin particles;
   polishing agent particles having an average circle-equivalent diameter of 0.1 μm to 3.0 μm; and
   silica particles having a compression aggregation degree of 60% to 95% and a particle compression ratio of 0.20 to 0.40;
   wherein the silica particles are surface-treated with a siloxane compound having a viscosity of 1,000 cSt to 50,000 cSt, and the surface attachment amount of the siloxane compound is from 0.01% by weight to 5% by weight.

2. The resin particle composition according to claim 1, wherein an average circle-equivalent diameter of the silica particles is from 40 nm to 200 nm.

3. The resin particle composition according to claim 1, wherein a particle dispersion degree of the silica particles is 90% to 100%.

4. The resin composition according to claim 1, wherein the siloxane compound is silicone oil.

5. The resin particle composition according to claim 1, wherein an average circularity degree of the silica particles is 0.85 to 0.98.

6. The resin particle composition according to claim 1, wherein the silica particles are sol-gel silica particles.

7. The resin particle composition according to claim 1, wherein a ratio (Da/Dsi) of the average circle-equivalent diameter (Da) of the polishing agent particles to the average circle-equivalent diameter (Dsi) of the silica particles is from 0.5 to 75.

* * * * *